Aug. 23, 1949.   C. A. STEEN   2,479,981
ELECTRIC HEATING DEVICE
Filed Aug. 23, 1946

Inventor
Carl A. Steen
by Sommers + Young
Attorneys

UNITED STATES PATENT OFFICE 2,479,981

ELECTRIC HEATING DEVICE

Carl August Steen, Getinge, Sweden

Application August 23, 1946, Serial No. 692,507
In Sweden February 26, 1945

7 Claims. (Cl. 219—40)

The invention relates to an electric heating device with electrodes for heating a liquid by means of the current passing between the electrodes through the liquid. Heating devices of this kind have the disadvantage that the current varies within wide limits. When the electrodes are immersed in water a maximum has thus been obtained at a temperature of the water of about 95° C., but after the beginning of boiling the current is essentially reduced owing to the increased resistance of the water mixed with steam bubbles.

One object of the invention is to provide an electrode with more constant power during the periods before and after the beginning of boiling.

Another object is to obtain an electrode of great capacity and compact construction.

Figure 1:
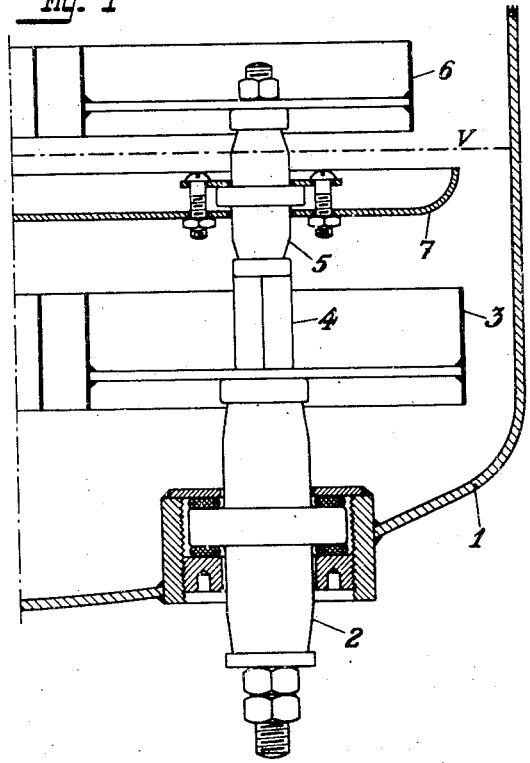
Figure 2:
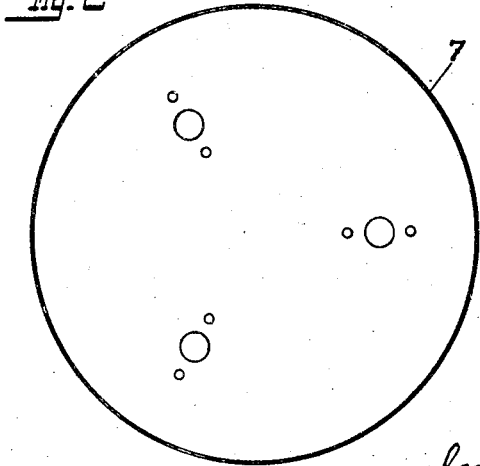

Other objects and advantages will appear from the following specification and accompanying drawing in which Fig. 1 is a vertical section of a preferred embodiment of the invention; and Fig. 2 is a top view of a detail on reduced scale.

The bottom 1 of a steam generating chamber is provided with an electric inlet 2 carrying a single electrode in a three-phase electrode aggregate 3. The electrodes are formed by bending a band material to a suitable form and are provided with a supporting brace which is pressed against the inlet isolator by means of a lengthening piece 4 screwed on the bolt of the inlet. On the piece 4 is screwed a similar inlet 5 carrying on its top an electrode belonging to a three-phase upper electrode aggregate 6 of a construction similar to that of the lower electrode aggregate 3. The upper inlet or insulator 5 serves also as support for a fender or screen 7 between the both electrode aggregates and of substantially the same extension or diameter as the lower electrode aggregate 3. The upper electrode aggregate 6, however, has a somewhat reduced diameter.

As appears from the drawing the edge of the fender is bent upwards along a rounded off curve. The water level V is located between the electrode aggregates before the water is heated to the boiling point so that only the aggregate 3 is in action. When the water begins to boil, it streams together with steam bubbles from the aggregate 3 towards the fender 7. As shown in Fig. 2 the fender may consist of a circular plate of sheet metal with three holes for the insulators 5 and three pairs of holes for their binding screws. The steam cushion under the fender and the steam bubbles in the water cause the water level V to rise so that the upper electrode aggregate is brought partly or entirely in contact with the water and begins to act. The steam from the lower aggregate is guided by the fender so as to pass outside the upper aggregate, and steam generation of the upper aggregate is thus not disturbed. Through the space between the edges of the upper aggregate and the fender the water flows unhindered down under the upper electrode.

The fender 7 thus forms a resistance to the steam bubbles so that the water level rises sufficiently, and if desired the fender may be formed concave downwards so that the steam cushion is enlarged. The more steam as is generated by the lower aggregate the more is its power reduced but the higher reaches the water along the electrodes in the upper aggregate and the more increases the power of said aggregate. The boiler may be provided with an automatic feed water supplying device known per se and adapted to keep the quantity of water constant in the boiler. The water level is V before boiling and higher after boiling has begun. Now it is obvious that the height of the upper aggregate, the distance between the aggregates and the water level V may be arranged in such a way that the electric power is nearly the same before and after boiling has begun. If a boiler previously has been constructed for a certain maximum effect, this effect has been utilized only during the heating period, whereas during the boiling period it has been possible to use only part thereof. This disadvantage, however, may be avoided according to the invention.

I claim:

1. In an electric heating device with electrodes for heating a liquid by means of the current passing between the electrodes through the liquid, the combination of two electrode aggregates located one above the other and a separating fender between said aggregates for causing steam from the lower electrode aggregate to pass outwards and outside the upper electrode aggregate.

2. In an electric heating device with electrodes for heating a liquid by means of the current passing between the electrodes through the liquid, the combination of two electrode aggregates located one above the other, each aggregate comprising electrodes formed of band material set up on its edge and located side by side so as to form a disc electrode aggregate, and a separating fender between said aggregates for causing steam from the lower electrode aggregate to pass outwards and outside the upper electrode aggregate.

3. In an electric heating device with electrodes for heating a liquid by means of the current passing between the electrodes through the liquid, the combination of two electrode aggregates located one above the other, the upper electrode aggregate being located at least partly above the liquid level when the liquid has a temperature below its boiling point, and a separating fender between said aggregates for causing steam from the lower electrode aggregate to pass outwards and outside the upper electrode aggregate.

4. In an electric heating device with electrodes for heating a liquid by means of the current passing between the electrodes through the liquid, the combination of two electrode aggregates located one above the other and a separated fender between said aggregates for causing steam from the lower electrode aggregate to pass outwards and outside the upper electrode aggregate, said fender having a greater lateral extension than the upper one of said electrode aggregates.

5. In an electric heating device with electrodes for heating a liquid by means of the current passing between the electrodes through the liquid, the combination of two electrode aggregates located one above the other and a separating fender between said aggregates for causing steam from the lower electrode aggregate to pass outwards and outside the upper electrode aggregate, said fender being provided with an upwardly bent edge.

6. In an electric heating device with electrodes for heating a liquid by means of the current passing between the electrodes through the liquid, the combination of two electrode aggregates located one above the other and a separating fender between said aggregates for causing steam from the lower electrode aggregate to pass outwards and outside the upper electrode aggregate, said fender being concave downwards.

7. In an electric heating device with electrodes for heating a liquid by means of the current passing between the electrodes through the liquid, the combination of two electrode aggregates located one above the other, each aggregate comprising electrodes formed of band material set up on its edge and located side by side so as to form a disc electrode aggregate, and a separating fender between said aggregates for causing steam from the lower electrode aggregate to pass outwards and outside the upper electrode aggregate, the distances from said electrode aggregates to an intermediate fluid level being adjusted to keep the electric power substantially constant before and during boiling.

CARL AUGUST STEEN.

REFERENCES CITED

The following references are of record in the file of this patent:

UNITED STATES PATENTS

| Number | Name | Date |
| --- | --- | --- |
| 1,548,741 | Pou | Aug. 4, 1925 |
| 1,677,299 | Schneider | July 17, 1928 |
| 2,243,651 | Price | May 27, 1941 |